United States Patent [19]

Nguyen et al.

[11] Patent Number: 5,283,041
[45] Date of Patent: Feb. 1, 1994

[54] CATALYTIC INCINERATION OF ORGANIC COMPOUNDS

[75] Inventors: Pascaline H. Nguyen, Morganville; Eric W. Stern, Mountainside; Michel Deeba, N. Brunswick; Patrick L. Burk, Freehold, all of N.J.

[73] Assignee: Engelhard Corporation, Iselin, N.J.

[21] Appl. No.: 929,734

[22] Filed: Aug. 13, 1992

[51] Int. Cl.$^5$ .................. B01D 53/36; B01J 21/06; B01J 23/22; B01J 23/64

[52] U.S. Cl. ................. 423/240 S; 423/245.1; 502/304; 502/308; 502/310; 502/324; 502/325; 502/326; 588/206; 588/207

[58] Field of Search .............. 502/304, 308, 310, 324, 502/325, 326; 423/240 S, 245.1, 245.3; 588/206, 207

[56] References Cited

U.S. PATENT DOCUMENTS

| | | | |
|---|---|---|---|
| 3,767,453 | 10/1973 | Hoekstra | 117/46 CA |
| 3,785,998 | 1/1974 | Hoekstra | 252/477 R |
| 3,920,583 | 11/1975 | Pugh | 252/465 |
| 3,972,979 | 8/1976 | Kageyama | 423/240 |
| 4,053,557 | 11/1977 | Kageyama | 423/240 |
| 4,059,675 | 11/1977 | Yang et al. | 423/240 |
| 4,059,676 | 11/1977 | Yang et al. | 423/240 |
| 4,059,683 | 11/1977 | Lindberg et al. | 423/481 |
| 4,085,193 | 4/1978 | Nakajima et al. | 423/239 |
| 4,152,246 | 1/1979 | Weisang | 208/139 |
| 4,157,374 | 6/1979 | Carpenter et al. | 423/210 |
| 4,163,862 | 8/1979 | Dolhyj et al. | 502/304 X |
| 4,209,496 | 6/1980 | Carpenter et al. | 423/210 |
| 4,500,650 | 2/1985 | Wyatt et al. | 502/204 |
| 4,983,366 | 1/1991 | Deller et al. | 423/240 |
| 5,227,356 | 7/1993 | Hess et al. | 423/245.3 X |

FOREIGN PATENT DOCUMENTS 2059934  11/1980  United Kingdom .

OTHER PUBLICATIONS

Bond and Sadeghi, Catalysed Destruction of Chlorinated Hydrocarbons, 1975-25, 241-248.
Murakami, Inomata, Miyamoto, Mori,—Structure Sensitive and Insensitive Reactions on Supported Vanadium Oxide Catalysts,—Chem. Lett., 1978, 1355.
Chatterjee and Greene, Oxidative Catalysis of Chlorinated Hydrocarbons by Metal Loaded Acid Catalysts, Rev. 1991 Journal of Catalysis 130, 76-85 (1991).
Lester, Catalytic Destruction of Hazardous Halogenated Organic Chemicals, 1989, 89-96A.3.
Spivey, Complete Catalytic Oxidation of Volatile Organics, 1987, 26, 2165-2180.
Abstract of Japanese Patent Application Assigned to Asahi Chemical Ind. KK (J61141919-A) (Jun. 28, 1986).
Abstract of EP Appln. 306540A (Mar. 15, 1989).

*Primary Examiner*—Helen M. S. Sneed
*Assistant Examiner*—Douglas J. McGinty

[57] ABSTRACT

A catalyst is disclosed for treating gas streams containing organic compounds such as halogenated organic compounds. The catalyst is comprised of vanadium oxide, zirconium oxide and at least one oxide of manganese, cerium or cobalt.

Also disclosed is a process for treating gas streams using such catalysts.

26 Claims, No Drawings

CATALYTIC INCINERATION OF ORGANIC COMPOUNDS

BACKGROUND OF THE INVENTION

1. Field of the Invention

This invention relates to novel catalysts for the catalytic destruction of organic compounds contained in waste gas streams and to a process using these catalysts.

2. Description of Related Art

Presently, there is great concern about contamination of the environment by hazardous volatile organics originating in the manufacture of organic chemicals, cleaning and degreasing processes, and vent or exhaust air from air stripping of contaminated groundwater or soil. Typically, thermal incineration is used in the destruction of these materials but this requires very high temperatures (1300° C.) and special equipment resulting in high capital and maintenance costs. Carbon adsorption is an alternative. However, this process does not destroy the pollutants but merely concentrates them. The pollutants must then be removed and the carbon regenerated, a costly and tedious process.

Catalytic oxidation is an energy efficient and economical way of destroying hazardous materials. It operates at significantly lower temperatures and lower residence times than thermal incineration and requires smaller reactors made of less expensive materials.

Methods for the catalytic oxidation of organic and halogenated organic compounds are well known in the art. For example, in the article by G.C. Bond and N. Sadeghi, "Catalyzed Destruction of Chlorinated Hydrocarbons" *J. Appl. Chem. Biotechnol.*, 1975, 25, 241-248, it is reported that chlorinated hydrocarbons are converted to HCl and $CO_2$ over platinum on gamma alumina catalyst.

U.S. Pat. Nos. 3,972,979 and 4,053,557 describe the decomposition of halohydrocarbons by oxidation over chromium oxide or a boehmite supported platinum.

U.S. Pat. Nos. 4,059,675, 4,059,676 and 4,059,683 describe methods for decomposing halogenated organic compounds using catalysts containing ruthenium, ruthenium-platinum and platinum, respectively, in the presence of an oxidizing agent at a temperature of at least 350° C.

The article by James J. Spivy, "Complete Catalytic Oxidation of Volatile Organics," *Ind. Eng. Chem. Res.*, 1987, 26, 2165-2180, is a review of the literature dealing with the heterogenous catalytic oxidation of volatile organic compounds.

The article by S. Chatterjee and H. L. Greene, "Oxidative Catalysis of Chlorinated Hydrocarbons by Metal-Loaded Acid Catalysts," Journal of Catalysis, 130, 76-85 (1991), reports on a study of the catalytic oxidation of methylene chloride in air using supported zeolite catalysts H—Y, Cr—Y and Ce—Y.

U.S. Pat. No. 4,983,366 describes a method for the catalytic conversion of waste gases containing hydrocarbons, halogenated hydrocarbons and carbon monoxide by passing the waste gases through a first zone containing a catalyst such as aluminum oxide, silicon dioxide, aluminum silicate and/or a zeolite optionally containing oxidic compounds of barium, manganese, copper, chromium, manganese and nickel, and then through a second zone containing a catalyst such as platinum and/or palladium or platinum and rhodium.

PCT international application No. PCT/U.S. 90/02386 describes a catalytic process for converting or destroying organic compounds including organohalogen compounds using a catalyst which contains as a catalytic component titania and the preferred catalyst also contains vanadium oxide, tungsten oxide, tin oxide, and at least one noble metal selected from the group consisting of platinum, palladium and rhodium characterized in that the vanadium oxide, tungsten oxide and noble metals are uniformly dispersed on the titania.

There is still a need for catalysts and processes for the oxidative destruction of halogenated organics and other organic compounds which provide improved activity and stability.

SUMMARY OF THE INVENTION

This invention relates to a catalyst and process for treating gas streams.

In one embodiment, this invention relates to a catalyst for treating a gas stream containing compounds selected from the group consisting of halogenated organic compounds, other organic compounds and mixtures thereof, said catalyst comprising vanadium oxide, zirconium oxide and at least one oxide selected from the group consisting of manganese oxide, cerium oxide and cobalt oxide.

In another embodiment, this invention relates to a process for treating a gas stream containing compounds selected from the group consisting of halogenated organic compounds, other organic compounds and mixtures thereof, comprising contacting said gas stream at a temperature of from about 175° C. up to about 550° C. with a catalyst comprising vanadium oxide, zirconium oxide and at least one oxide selected from the group consisting of manganese oxide, cerium oxide and cobalt oxide in the presence of an effective amount of oxygen and water.

DESCRIPTION OF THE PREFERRED EMBODIMENT

As previously stated, this invention provides catalysts and a process for using said catalysts to treat gas streams containing halogenated organic and/or other organic compounds.

The catalyst of this invention comprises vanadium oxide, zirconium oxide and at least one of manganese oxide, cerium oxide or cobalt oxide. The catalyst may also contain other components comprising one or more platinum group metals, which as used herein are platinum, palladium and rhodium, and/or one or more oxides of tungsten and tin.

When reference is made herein to a metal oxide(s) or oxides(s) of a metal, it is intended to include all oxide forms of such metal and mixtures thereof as well as hydroxy-oxides, hydrous oxides and the like.

Typically, the catalysts of this invention contain from about 40 up to about 88 weight percent zirconium oxide (as $ZrO_2$), preferably from about 60 up to about 85 weight percent; and from about 3 up to about 48 weight percent of one or more oxides of manganese, cerium or cobalt, preferably about 10 up to about 30 weight percent.

The catalysts of this invention contain an amount of vanadium oxide effective to promote the decomposition of halogenated organic compounds or other organic compounds. It is desirable that the vanadium oxide be present in an amount from about 0.1 up to about 20 weight percent in the oxide form (as $V_2O_5$) of the catalyst and preferably from about 2 up to about 10 weight percent.

If the catalyst contains tungsten, it will typically contain up to about 20 weight percent in the oxide form ($WO_3$) and preferably from about 5 up to about 10 weight percent.

It is desirable that the noble metal (platinum group metal) be present on the catalyst in an amount from about 0.01 to about 5 weight percent of the catalyst, and preferably from about 0.1 to about 1.0 weight percent.

Finally, if the catalyst contains tin oxide, it is desirable that tin oxide be present in an amount from about 0.1 to about 2.0 weight percent in the oxide form ($SnO_2$) and preferably from about 0.3 to about 1.0 weight percent of the catalyst.

In a preferred embodiment, the catalyst is characterized by a core material comprising zirconium oxide and one or more oxides of manganese, cerium or cobalt with vanadium oxide and such previously discussed other components dispersed on this core material. The other component is preferably a platinum group metal. The preferred platinum group metal is platinum. The other components that can also be dispersed on the core material include oxides of tungsten and tin.

In this preferred embodiment, the core material containing zirconium oxide and at least one oxide of manganese, cerium or cobalt is first prepared, then vanadium oxide and other components are dispersed thereon.

Typically, the core material of this invention contains up to about 90 weight percent zirconium oxide ($ZrO_2$), preferably from about 50 up to about 80 weight percent.

In the case of a core material comprising manganese oxide and zirconium oxide, it is desirable that manganese be present in the core material in an amount up to about 50 weight percent (as $Mn_2O_3$); typically, containing at least about 10 weight percent manganese oxide and preferably from about 15 up to about 35 weight percent.

In the case of a core material comprising cerium oxide and zirconium oxide, it is desirable that cerium oxide be present in the core material in an amount up to 50 weight percent (as $CeO_2$); typically, containing at least about 14 weight percent cerium oxide, and preferably from about 15 up to about 25 weight percent.

In the case of a core material comprising cobalt oxide and zirconium oxide, it is desirable that cobalt oxide be present in the core material in an amount up to 50 weight percent as $Co_3O_4$; typically, containing at least 10 weight percent, preferable from about 15 up to about 35 weight percent.

The core material may be combined with other materials such as binders or adhesion aids or active components such as titania, although it is preferred that titania is absent from the catalyst of this invention. The core material may be prepared by means well known to those of ordinary skill in the art and include physical mixtures, cogellation, coprecipitation or impregnation. The preferred techniques for preparing the core material of this invention are cogellation and coprecipitation. For further details of these methods see U.S. Pat. No. 4,085,193 which is incorporated by reference for its teaching of techniques for coprecipitation and cogellation. Impregnation may be used in a manner analogous to the methods discussed with regard to dispersing vanadium oxide and other components on the core material.

For example, a core material of zirconium oxide and manganese oxide may be prepared by mixing aqueous solutions of a suitable zirconium oxide precursor such as zirconium oxynitrate, zirconium acetate, zirconium oxychloride, or zirconium oxysulfate and a suitable manganese oxide precursor such as manganese nitrate, manganese acetate, manganese dichloride or manganese dibromide, adding a sufficient amount of a base such as ammonium hydroxide to obtain a pH of 8-9, filtering the resulting precipitate, washing with water, drying at 120°-150° C. and then calcining at 450°-500° C.

A similar procedure employing a soluble cerium or cobalt compound such as cerium nitrate, cerium acetate, cerium sulfate or cerium chloride, cobalt nitrate, cobalt chloride or cobalt bromide may be used if a core material comprising zirconium oxide and oxides of ceria or cobalt is desired.

It is desirable that the core material and the catalyst of this invention have a surface area of from about 25 $m^2/g$ to about 275 $m^2/g$, preferably from about 100 up to about 250 $m^2/g$.

The vanadium oxides and the other components can be dispersed onto the core material by means well known in the art. If both vanadium, and one or more other components are desired, they can all be impregnated simultaneously or sequentially in any order. Impregnation is the preferred method. Impregnation may be carried out by techniques well known to those of ordinary skill in the art.

For example, one may wish to disperse vanadium oxide in combination with other components onto the core material. One way to disperse these components is to impregnate core material in particulate or powder form (for example spheres, tablets, extrudates or powder as representative examples of shapes of core material) with a solution containing a vanadium compound and/or compounds of the other components. The solution may be an aqueous solution, one using an organic solvent or a mixture of the two, with an aqueous solution being preferred. The criteria used in selecting the compounds are that the compounds be soluble in the desired solvent and that the compounds can be converted to the appropriate oxide by heating at elevated temperatures or by chemical reactions. Illustrative of these compounds are the halides of vanadium, tungsten, and tin; oxyacids, oxyacid salts and oxysalts of vanadium, tungsten and tin. Specific examples are tungsten dioxydichloride, tin bromide, tin chloride, tungstic acid, ammonium paratungstate, ammonium meta tungstate, vanadium oxychloride, vanadium oxydichloride, vanadic acid, cobaltic acid, vanadyl sulfate, tin acetate, tin nitrate, tin chloride and ammonium meta vanadate. Ammonium meta tunstate, ammonium meta vanadate and tin chloride are the preferred compounds.

The impregnation of the particulates or powder with the metal compound solution may be carried out in ways well known in the art. One convenient method is to place the core material in particulate form, e.g., granules, into a rotary evaporator which is partially immersed in a heating bath. The impregnating solution which contains an amount of the desired metal compound to provide the desired concentration of oxide or metal in the finished catalyst is now added to the core material and the mixture cold rolled (no heat) for a time from about 10 to 60 minutes. Next, heat is applied and the solvent is evaporated. This usually takes from about 1 to about 4 hours. Finally, the solid is removed from the rotary evaporator and calcined in air at a temperature of about 400° C.-600° C. for about 1 to 3 hours. If both vanadium and one or more other components are desired, they may be impregnated simultaneously or sequentially in any order.

Alternatively, the core material in powder form is placed into a planetary mixer and the impregnating solution is added under continuous agitation until a state of incipient wetness is achieved. The powder is then dried in an oven for 4–8 hours and calcined from about 400° C.–600° C. for 1–3 hours.

Other methods of dispersing these oxides onto core material are coprecipitation or cogellation.

If a platinum group metal component is desired on the catalyst, it may be dispersed onto the core material before or after the addition of vanadium oxide or the other components to the core material by impregnating the material with a solution containing a compound of the desired platinum group metal(s). The solution may be an aqueous or non-aqueous (organic solvent) solution. Any platinum group metal compound may be used provided the compound is soluble in the chosen solvent and decomposes to the metal upon heating in air at elevated temperatures. Illustrative of these platinum group metal compounds are chloroplatinic acid, ammonium chloroplatinate, hydroxy disulfite, bromoplatinic acid, platinum tetrachloride hydrate, platinum dichlorocarbonyl dichloride, dinitrodiamino platinum, amine solubilized platinum hydroxide, rhodium trichloride, hexaamminerhodium chloride, rhodium carbonylchloride, rhodium trichloride hydrate, rhodium nitrate, rhodium acetate, chloropalladic acid, palladium chloride, palladium nitrate, diamminepalladium hydroxide and tetraamminepalladium chloride. The impregnation procedure is analogous to that used to disperse vanadium oxide and other components.

The catalyst of the instant invention may be used in any configuration, shape or size which exposes it to the gas to be treated. For example, the catalyst can be conveniently employed in particulate form or the catalyst can be deposited onto a solid monolithic carrier. When the particulate form is desired, the catalyst can be formed into shapes such as tablets, pellets, granules, rings, spheres, etc. The particulate form is especially desirable where large volumes of catalysts are needed, and for use in circumstances in which frequent replacement of the catalyst may be desired. In circumstances in which less mass is desirable or in which movement or agitation of particles of catalyst may result in attrition, dusting and resulting loss of dispersed metals or oxides or undue increase in pressure drop across the particles due to high gas flows, a monolithic form is preferred.

In the employment of a monolithic form, it is usually most convenient to employ the catalyst as a thin film or coating deposited on an inert carrier material which provides the structural support for the catalyst. The inert carrier material can be any refractory material such as ceramic or metallic materials. It is desirable that the carrier material be unreactive with the catalytic components and not be degraded by the gas to which it is exposed. Examples of suitable ceramic materials include sillimanite, petalite, cordierite, mullite, zircon, zircon mullite, spodumene, alumina-titanate, etc. Additionally, metallic materials which are within the scope of this invention include metals and alloys as disclosed in U.S. Pat. No. 3,920,583 (incorporated herein by reference) which are oxidation resistant and are otherwise capable of withstanding high temperatures. For the treatment of gases containing halocarbons, ceramic materials are preferred.

The monolithic carrier material can best be utilized in any rigid unitary configuration which provides a plurality of pores or channels extending in the direction of gas flow. It is preferred that the configuration be a honeycomb configuration. The honeycomb structure can be used advantageously in either unitary form, or as an arrangement of multiple modules. The honeycomb structure is usually oriented such that gas flow is generally in the same direction as the cells or channels of the honeycomb structure. For a more detailed discussion of monolithic structures, refer to U.S. Pat. No. 3,785,998 and U.S. Pat. No. 3,767,453, which are incorporated herein by reference.

If particulate form is desired, the catalyst can be formed into granules, spheres or extrudates by means well known in the industry. For example, the catalyst powder can be combined with a binder such as a clay and rolled in a disk pelletizing apparatus to give catalyst spheres. The amount of binder can vary considerably but for convenience is present from about 10 to about 30 weight percent.

If a monolithic form is desired, the catalyst of this invention can be deposited onto the monolithic honeycomb carrier by conventional means. For example, a slurry can be prepared by means known in the art such as combining the appropriate amounts of the catalyst of this invention in powder form, with water. The resultant slurry is ball-milled for about 8 to 18 hours to form a usable slurry. Other types of mills such as impact mills can be used to reduce the milling time to about 1–4 hours. This slurry can now be used to deposit a thin film or coating of catalyst of this invention onto the monolithic carrier by means well known in the art. Optionally, an adhesion aid such as alumina, silica, zirconium silicate, aluminum silicates or zirconium acetate can be added in the form of an aqueous slurry or solution. A common method involves dipping the monolithic carrier into said slurry, blowing out the excess slurry, drying and calcining in air at a temperature of about 450° C. to about 600° C. for about 1 to about 4 hours. This procedure can be repeated until the desired amount of catalyst of this invention is deposited on said monolithic honeycomb carrier. It is desirable that the catalyst of this invention be present on the monolithic carrier in an amount in the range of about 1–4g of catalyst per in$^3$ of carrier volume and preferably from about 1.5–3g/in$^3$.

An alternative method of preparation is to disperse vanadium oxide and such other optional components on a core material coated monolithic carrier which has been coated with only core material by the above procedure. The compounds which can be used and the methods of dispersion are the same as described above. After one or more of these compounds have been dispersed onto the core material coated carrier, the catalyst is dried and calcined at a temperature of about 400° C. to about 600° C. for a time of about 1 to 6 hours. If both vanadium and such other components are desired, they may be impregnated simultaneously or individually in any order.

If a platinum group metal component is desired on the catalyst, one or more may be dispersed onto a core material coated monolith in an analogous way to that previously described. That is, the monolithic honeycomb carrier which has dispersed thereon core material and other optional components can be dipped into an aqueous solution containing a soluble and decomposable noble metal compound, dried and calcined at a temperature of 400° to 500° C. for about 1 to about 5 hours. Any decomposable platinum group metal compound as enumerated above may be used. The concentration of the platinum group metals are also as stated above. Although the platinum group metal(s) may be impregnated before the vanadium and other components, it is preferred that they be impregnated after the vanadium and other components.

Another embodiment of this invention is a process for destroying or converting by oxidation and/or hydrolysis halogenated organic compounds (also referred to herein as organohalogen compounds) and other organic compounds present in a gas stream comprising contacting the gas stream at a temperature of about 175° C. to about 550° C. and preferably at a temperature of about 250° C. to about 475° C. with the catalyst described heretofore. The organohalogen compounds which may be treated are any organic compounds which contain at least one halogen atom in the structure of the compounds. Some specific examples are chlorobenzene, dichlorobenzenes, fluorobenzene, carbon tetrachloride, chloroform, methyl chloride, vinyl chloride, methylene chloride, ethyl chloride, ethylene chloride, ethylidene dichloride, 1,1,2-trichloroethane, 1,1,1-trichloroethane, methyl bromide, ethylene dibromide, trichloroethylene, tetrachloroethylene, polychlorinated biphenyls, chlorotrifluoromethane, dichlorodifluoromethane, 1-chlorobutane, ethyl bromide, dichlorofluoromethane, chloroformic acid, trichloroacetic acid and trifluoroacetic acid. The process of this invention may also treat a gas stream which contains other organic compounds which do not contain any halogens in their structure. These other organic compounds include hydrocarbons, oxygenates, amines, etc. Specific examples include benzene, toluene, xylenes, phenol, ethyl alcohol, methyl acetate, methyl formate isopropyl amine, butyl phthalate, aniline, formaldehyde, methyl ethyl ketone, acetone, etc.

It is also desirable that the gas stream to be treated contain water vapor so that haloacids are formed, e.g., HCl, instead of molecular halogen compounds, e.g., $Cl_2$. It is desirable to produce haloacids instead of molecular halogen compounds for two reasons. First, an acid such as HCl is much more easily trapped and neutralized from the effluent gas stream than chlorine ($Cl_2$) thereby reducing corrosion problems in downstream process equipment. Second, molecular halogen compounds can attack the components of the catalyst much more easily than haloacids, thereby decreasing the life of the catalyst.

Usually the gas streams will contain adequate water since the gas stream is often vent gas from air stripping of contaminated ground water or soil or contains combustion products from the hydrocarbon or other hydrogen containing organic species. However, if the gas stream does not contain any water, it may be added to the gas stream prior to contacting the gas stream with the catalyst. The minimum amount of water needed is that amount which will give an H:X atomic ratio of 1:1 where H is the total hydrogen atoms and X is the total halogen atoms. An H:X atom ratio of about 6:1 or greater is preferred.

Another method of providing the needed water to a dry gas stream is to add a hydrocarbon or other organic compound, e.g., ethylene, propylene, methanol, ethanol, acetone, methyl ethyl ketone, etc. if these are not already in the waste gas streams which then are combusted over the catalyst to carbon dioxide and water. The amount of such organic compound is chosen so that the ratio of total hydrogen from all sources in the gas stream entering the catalyst reactor to total halogen atoms is at least 1:1 and preferably 6:1 or greater. Additionally, if the gas stream does not contain oxygen (air), it must be added to carry out the combustion.

Many gas streams already contain enough oxygen ($O_2$) to oxidize all the pollutants, and most gas streams contain a large excess. In general, a large excess of oxygen greatly facilitates the oxidation reaction. In the event that the gas stream does not contain enough oxygen, oxygen, preferably as air, may be injected into the gas stream prior to contact with the catalyst. The minimum amount of oxygen which must be present in the gas stream is the stoichiometric amount necessary to convert the carbon and hydrogen in the compounds present to carbon dioxide and water. For convenience and to insure that the oxidation reaction goes to completion, it is desirable that an excess of oxygen be present. Accordingly, it is preferable that at least two times the stoichiometric amount and most preferably at least five times the stoichiometric amount of oxygen be present in the waste gas stream.

The flow rate of the gas stream over the catalyst is not critical since the contact time required to destroy the pollutants is very short. Therefore, the volume hourly space velocity (VHSV) can vary substantially from about 1,000 to about 100,000 hr.$^{-1}$ and preferably from about 5,000 to about 15,000 hr.$^{-1}$ based on gas rates calculated at standard temperature and pressure. The VHSV can be controlled by adjusting the size of the catalyst bed.

The process of this invention is also applicable to processes wherein liquid organohalogen compounds and organic compounds are vaporized and mixed with oxygen. It is also be understood that the process of the present invention is not dependent on the concentration of the organic compounds and/or the organohalogen compounds. Thus, gas streams with a very wide concentration range of pollutants can be treated by the instant process.

The catalysts of this invention are very active and stable. For example, laboratory test data shows that a catalyst consisting of a monolithic cordierite honeycomb carrier coated with manganese oxide and zirconia on which vanadia is dispersed destroyed 99% trichloroethylene in a test stream at 450° C. and 7500 VHSV for at least 1200 hours.

Once the gas stream has been contacted with the catalyst and the pollutants destroyed, the catalyst treated gas stream may be further treated, if desired, to remove the halogen acid and any halogens which are formed during the conversion process. For example, the catalyst treated gas stream may be passed through a scrubber to absorb the acid. The scrubber may contain a base such as sodium or ammonium hydroxide which neutralizes the acids and solubilizes the halogens as basic hypohalites and halides.

This invention is exemplified in the following examples. Of course, these examples are not intended as limiting this invention as modification of the examples by ordinary expedient will be readily apparent to those of ordinary skills in the art.

EXAMPLE 1

A mixture of a 20% solution of zirconyl oxynitrate (790 g) and a 50% manganese nitrate solution (100g) is prepared. A 7M solution o ammonium hydroxide is added to this mixture with constant stirring to obtain a pH of 3.5 and gel formation. One liter of water is added to the gel and the gel is broken by stirring with a large spatula. A 7M ammonium hydroxide solution is added to obtain a pH of 8-9. This mixture is then filtered and washed with additional water. The resulting powder is dried at 120° C. overnight and then calcined at 500° C. for two hours to yield a coprecipitated manganese oxide/zirconia powder.

EXAMPLE 2

The manganese oxide/zirconia powder prepared in Example 1 (800g) is impregnated to incipient wetness with 288g of an ammonium meta vandate solution (11.1% in water). The resulting powder is dried at 120° C. overnight and then calcined at 500° C. for one hour to yield the desired vanadium oxide on manganese oxide/zirconia catalyst. The resultant catalyst powder contains 4.0% vanadium oxide. A slurry of this powder is prepared by placing 40g of the powder in a ball mill with 100g of water and milling for 12 hours. To this slurry is added an alumina (Condea SBA-150) slurry (48% solids) in sufficient quantity to produce a mixture containing 82% of the vanadia/manganese oxide/zirconia slurry and 18% of the alumina slurry. A cylindrical shaped monolith cordierite honeycomb having a diameter of 1 inch, a length of 3 inches and 400 cells per square inch is dipped into the above-described slurry. After dipping, the excess slurry is blown out with an air gun and the honeycomb is dried at 120° C. for one hour and calcined at 500° C. for one hour. This procedure is repeated until the monolith has a catalyst loading of 1.5g/in$^3$. Prior to testing, the catalyst prepared above is cut into one inch long pieces and its diameter reduced to 7/8 in. by grinding.

EXAMPLE 3

The vanadium oxide/manganese oxide/zirconia catalyst prepared in Example 2 is impregnated with 41.1g of an aqueous amine-solubilized platinum hydroxide (H$_2$Pt(OH)$_6$) solution (15.1% Pt) and 69.7g of water. The powder is then dried at 120° C. overnight and calcined at 500° C. for one hour. A cordierite honeycomb of the size and shape described in Example 2 is coated in the same way as the catalyst described in Example 2.

EXAMPLE 4

A vanadium oxide on cerium oxide/zirconia powder is prepared in the same manner as the vanadia/manganese/zirconia catalyst described in Example 2 employing 800g ceria/zirconia (20% CeO$_2$) impregnated with 288g of an 11.1% of aqueous ammonium meta vanadium solution. The powder of this example is applied to the honeycomb without the alumina adhesion aid.

EXAMPLE 5

A mixture of a 20% solution of zirconyl oxynitrate (790g), a 50% solution of manganese nitrate (100g) and 81.32g of cobalt nitrate is prepared. A 7M solution of ammonium hydroxide is added to this mixture with constant stirring to obtain a pH of 3.5 and gel formation. One liter of water is added to the gel and the gel is broken by stirring with a spatula. A 7M ammonium hydroxide solution is added to obtain a pH of 8-9. This mixture is filtered and washed with additional water. The resulting powder is dried at 120° C. overnight and then calcined at 500° C. for two hours to yield the desired cobalt oxide/manganese oxide/zirconia powder. This powder (100g) is impregnated with 14g of an aqueous solution of ammonium meta vanadate (8%) diluted further with 260 ml. of water. The resulting powder is dried at 150° C. overnight and then calcined at 500° C. for one hour. The resultant catalyst powder contains 4.0% vanadium oxide (V$_2$O$_5$).

EXAMPLE 6

A test generally used to evaluate catalyst efficiency for the destruction of halogenated organics and other organic compounds uses a quartz tube reactor with a diameter of 1 inch placed inside a Lindberg furnace. The gases are introduced from the top of the tube and flow downward over the catalyst. Catalyst on a honeycomb monolith having a 7/8 inch diameter and 1 inch length is placed in the middle of the tube and the destruction of organic compounds by the catalyst is evaluated. The catalyst is tested at temperatures ranging from 175° C. to 450° C. The concentration of the organic compound is 1000 ppm in air containing 1.5% water and the volume hourly space velocity is 7500. A hydrocarbon analyzer (FID) or a gas chromatograph is used to analyze the outlet gas. The conversion efficiency is calculated at various temperatures using equation 1.

$$\% \text{ conversion} = [(C_{in} - C_{out})/C_{in}] \times 100 \quad (1)$$

where $C_{in}$ is the inlet concentration of the organic compound to be converted and $C_{out}$ is the outlet concentration.

The results of the foregoing test are shown in the following table to exemplify the destruction of halogenated organics and other organics using the catalysts of this invention.

TABLE I

| Catalyst | Organic Compound | Temperature | Conversion |
|---|---|---|---|
| Ex. 2 | TCE | 375° C. | 50% |
| Ex. 2 | TCE | 425° C. | 90% |
| Ex. 2 | TCE | 450° C. | 99% |
| Ex. 3 | TCE | 375° C. | 50% |
| Ex. 3 | TCE | 425° C. | 90% |
| Ex. 3 | TCE | 450° C. | 99% |
| Ex. 4 | TCE | 375° C. | 50% |
| Ex. 4 | TCE | 425° C. | 90% |
| Ex. 4 | TCE | 450° C. | 99% |
| Ex. 2 | Toluene | 320° C. | 50% |
| Ex. 2 | Toluene | 345° C. | 90% |
| Ex. 2 | Toluene | 350° C. | 99% |
| Ex. 3 | Toluene | 199° C. | 90% |
| Ex. 3 | Toluene | 225° C. | 99% |
| Ex. 2 | MC | 375° C. | 50% |
| Ex. 2 | MC | 400° C. | 90% |
| Ex. 2 | MC | 450° C. | 99% |
| Ex. 4 | MC | 375° C. | 50% |
| Ex. 4 | MC | 425° C. | 90% |
| Ex. 4 | MC | 450° C. | 99% |
| Ex. 2 | TetraCE | 375° C. | 50% |
| Ex. 2 | TetraCE | 425° C. | 90% |
| Ex. 2 | TetraCE | 450° C. | 99% |
| Ex. 4 | TetraCE | 375° C. | 50% |
| Ex. 4 | TetraCE | 425° C. | 90% |
| Ex. 4 | TetraCE | 450° C. | 99% |
| Ex. 2 | Chlorobenzene | 300° C. | 50% |
| Ex. 2 | Chlorobenezene | 350° C. | 90% |
| Ex. 2 | Chlorobenzene | 400° C. | 99% |

TCE = Trichloroethylene
MC = Methylene Chloride
Tetra CE = Tetrachloroethylene

What is claimed is:

1. A catalyst for treating a gas stream containing compounds selected from the group consisting of halogenated organic compounds, other organic compounds and mixtures thereof, said catalyst comprising from about 40 up to about 88 weight percent of zirconium oxide and (i) vanadium oxide and (ii) at least one oxide selected from the group consisting of manganese oxide, cerium oxide and cobalt oxide.

2. A catalyst according to claim 1 wherein said catalyst is characterized by a core material comprising zirconium oxide and one or more oxides of manganese, cerium or cobalt.

3. A catalyst according to claim 2 wherein the vanadium oxide is dispersed on the core material in an amount from about 0.1 weight percent up to about 20 weight percent (as $V_2O_5$) of the catalyst.

4. A catalyst according to claim 2 wherein zirconium oxide is present in the core material in an amount from about 50 weight percent up to about 90 weight percent (as $ZrO_2$).

5. A catalyst according to claim 2 wherein manganese oxide is present in the core material in an amount from about 10 weight percent up to about 50 weight percent (as $Mn_2O_3$).

6. A catalyst according to claim 2 wherein said core material consists essentially of zirconium oxide and manganese oxide.

7. A catalyst according to claim 1 wherein the catalyst further contains one or more platinum group metals in an amount from about 0.01 up to about 5 weight percent of the catalyst.

8. A catalyst according to claim 1 wherein the catalyst further contains tungsten oxide, tin oxide or mixtures thereof.

9. A catalyst according to claim 8 wherein tungsten oxide is present in an amount from about 5 up to about 20 weight percent (as $WO_3$) of the catalyst.

10. A catalyst according to claim 2 wherein the surface area of the core material is from about 25 $m^2/g$ up to about 275 $m^2/g$.

11. A catalyst for treating a gas stream containing compounds selected from the group consisting of halogenated organic compounds, other organic compounds and mixtures thereof, said catalyst comprising i) a core material consisting essentially of zirconium oxide and manganese oxide; and ii) vanadium oxide dispersed on said core material in an amount from about 0.1 weight percent up to about 20 weight percent (as $V_2O_5$) of the catalyst.

12. A catalyst according to claim 11 wherein one or more platinum group metals are further dispersed on the core material in an amount from about 0.01 up to about 5 weight percent of the catalyst.

13. A catalyst according to claim 11 wherein tungsten oxide, tin oxide or mixtures thereof are further dispersed on the core material.

14. A process for treating a gas stream containing compounds selected from the group consisting of halogenated organic compounds, other organic compounds and mixtures thereof, comprising contacting said gas stream at a temperature of from about 175° C. up to about 550° C. with a catalyst comprising from about 40 up to about 8 weight percent of zirconium oxide and (i) vanadium oxide and (ii) at least one oxide selected from the group consisting of manganese oxide, cerium oxide and cobalt oxide in the presence of an effective amount of oxygen and water.

15. A process according to claim 14 wherein said catalyst is characterized by a core material comprising zirconium oxide and one or more oxides of manganese, cerium or cobalt.

16. A process according to claim 15 wherein the vanadium oxide is dispersed on the core material in an amount from about 0.1 weight percent up to about 20 weight percent (as $V_2O_5$) of the catalyst.

17. A process according to claim 15 wherein the zirconium oxide is present in the core material in an amount from 50 weight percent up to about 90 weight percent (as $ZrO_2$).

18. A process according to claim 15 wherein the amount of manganese oxide present in the core material is from about 10 weight percent up to about 50 weight percent (as $Mn_2O_3$).

19. A process according to claim 15 wherein the catalyst further contains one or more platinum group metals dispersed on said core material in an amount from about 0.01 up to about 5 weight percent of the catalyst.

20. A process according to claim 14 wherein the catalyst further contains tungsten oxide, tin oxide or mixtures thereof.

21. A process according to claim 20 wherein tungsten oxide is present in an amount from about 5 up to about 20 weight percent (as $WO_3$) of the catalyst.

22. A process according to claim 15 wherein the surface area of the core material is from about 25 $m^2/g$ up to about 275 $m^2/g$.

23. A process for treating a gas stream containing compounds selected from the group consisting of halogenated organic compounds, other organic compounds and mixtures thereof, comprising contacting said gas stream at a temperature of from about 175° C. up to about 550° C. with a catalyst comprising i) a core material consisting essentially of zirconium oxide and manganese oxide; and ii) vanadium oxide dispersed on said core material in an amount from about 0.1 weight percent up to about 20 weight percent (as $V_2O_5$) of the catalyst.

24. A process according to claim 23 wherein said catalyst further contains one or more platinum group metals dispersed on the core material in an amount from about 0.01 up to about 5 weight percent of the catalyst.

25. A process according to claim 24 wherein the platinum group metal is platinum.

26. A process according to claim 24 wherein tungsten oxide, tin oxide or mixtures thereof are further dispersed on the core material.

* * * * *